US007013924B1

(12) United States Patent
Meyers et al.

(10) Patent No.: US 7,013,924 B1
(45) Date of Patent: Mar. 21, 2006

(54) FLUID PRESSURE SYSTEM INCLUDING FREE FLOATING BLADDER

(75) Inventors: Kenneth A. Meyers, Lena, WI (US); Thomas A. Moon, Lena, WI (US)

(73) Assignee: In-Well Technologies Inc., Lena, WI (US)

(*) Notice: Subject to any disclaimer, the term of this patent is extended or adjusted under 35 U.S.C. 154(b) by 0 days.

(21) Appl. No.: 10/990,618

(22) Filed: Nov. 17, 2004

Related U.S. Application Data

(60) Provisional application No. 60/495,588, filed on Nov. 17, 2003.

(51) Int. Cl.
*F16L 55/04* (2006.01)

(52) U.S. Cl. .......................... 138/30; 138/26; 220/721; 220/723; 166/228

(58) Field of Classification Search ................. 138/30, 138/26; 220/721, 720, 723; 166/228
See application file for complete search history.

(56) References Cited

U.S. PATENT DOCUMENTS

| | | | | |
|---|---|---|---|---|
| 2,273,505 | A * | 2/1942 | Florian | 138/28 |
| 2,530,190 | A * | 11/1950 | Carver | 138/26 |
| 2,695,753 | A * | 11/1954 | Kirk, Jr. | 237/8 R |
| 2,796,939 | A | 6/1957 | Woodruff | 166/228 |
| 2,806,537 | A | 9/1957 | Sparks, Sr. | 166/196 |
| 2,979,070 | A * | 4/1961 | Payne | 137/192 |
| 3,038,396 | A | 6/1962 | Jameson, Jr. et al. | 94/33 |
| 3,076,479 | A * | 2/1963 | Ottung | 138/30 |
| 3,261,296 | A | 7/1966 | Weber | 103/87 |
| 3,273,577 | A * | 9/1966 | Moore | 137/13 |
| 3,299,831 | A | 1/1967 | Watson, et al. | 103/220 |
| 3,376,898 | A * | 4/1968 | Hugley | 138/137 |
| 3,394,733 | A | 7/1968 | Jacuzzi | 137/568 |
| 3,442,292 | A | 5/1969 | Jacuzzi | 138/30 |
| 3,514,220 | A | 5/1970 | Hahn, Jr. | 417/151 |
| 3,536,102 | A | 10/1970 | Allweitz et al. | 138/30 |
| 3,543,854 | A | 12/1970 | Degen | 166/228 |
| 3,621,882 | A * | 11/1971 | Kupiec | 138/30 |
| 3,708,965 | A | 1/1973 | Domnick | 55/488 |
| 3,814,543 | A | 6/1974 | Gritz | 417/26 |
| 4,036,616 | A | 7/1977 | Byrns | 55/498 |
| 4,094,789 | A | 6/1978 | Kemper | 210/188 |
| 4,322,230 | A | 3/1982 | Schoen et al. | 55/316 |
| 4,431,052 | A | 2/1984 | James | 166/112 |
| 4,583,594 | A | 4/1986 | Kojicic | 166/228 |
| 4,936,383 | A | 6/1990 | Towner et al. | 166/68 |
| 5,190,108 | A | 3/1993 | Mansuy | 166/371 |
| 5,262,065 | A | 11/1993 | Hansen | 210/747 |
| 5,281,101 | A | 1/1994 | Bevington | 417/38 |
| 5,353,949 | A | 10/1994 | Seibert et al. | 220/371 |
| 5,411,084 | A | 5/1995 | Padden | 166/230 |

(Continued)

*Primary Examiner*—Patrick Brinson
(74) *Attorney, Agent, or Firm*—Alan D. Kamrath; Nikolai & Mersereau, P.A.

(57) ABSTRACT

A fluid pressure system (S) includes a flexible diaphragm bladder (172) located inside a pressure tank (164) installed within a fluid system such as well (168). In preferred aspects, the bladder (172) can be inflated by the introduction of air and is located within a flexible confining tube (198) for preventing over expansion of the bladder (172) and in the preferred form being of a cylindrical configuration and arranged concentrically around the bladder (172). The bladder (172) and the confining tube (198) are free floating in and without physical connection with the pressure tank (164) in preferred forms. The pressure tank (164) includes a flexible side wall (196) to allow folding or willing of the assembled fluid pressure system (S) in preferred forms.

23 Claims, 5 Drawing Sheets

U.S. PATENT DOCUMENTS 5,782,299 A 7/1998 Simone et al. .............. 166/230
5,803,174 A 9/1998 Gilmore et al. ............. 166/292
5,820,762 A 10/1998 Bamer et al. ............... 210/661
5,899,271 A 5/1999 Simone et al. .............. 166/230
5,937,944 A 8/1999 Simone et al. .............. 166/230
5,988,984 A 11/1999 Austin ....................... 417/44.2
6,109,349 A 8/2000 Simone et al. .............. 166/230
6,202,750 B1 3/2001 Ohanesian .................. 166/236
6,217,639 B1 4/2001 Jackson ....................... 90/134
6,328,071 B1 12/2001 Austin ......................... 138/30
6,349,765 B1 2/2002 Meyers et al. ............. 166/85.2
6,418,969 B1 7/2002 Bertagna ..................... 138/30
6,422,822 B1 7/2002 Holmes ......................... 417/9
6,595,277 B1 7/2003 Zins et al. ............... 166/75.13
6,684,945 B1 2/2004 Meyers .................... 166/75.13

* cited by examiner

FLUID PRESSURE SYSTEM INCLUDING FREE FLOATING BLADDER

CROSS REFERENCE

This application claims the benefit of Application No. 60/495,588 filed on Nov. 17, 2003.

BACKGROUND AND SUMMARY OF THE INVENTION

The present invention relates generally to a fluid pressure system. Specifically, this invention relates to a free floating bladder inserted within a fluid pressure system to store liquid or gas in the system, control liquid or gas expansion due to pressure or temperature changes, and control pressure, including pressure spikes, in the system by damping pressure changes.

Storing and controlling the flow of fluids such as liquids or gas and absorbing pressure changes within a fluid pressure system are important in many different situations. For example, pressure control systems are utilized in connection with wells. Commercial buildings, residential buildings and municipal water systems are often equipped with water pressure systems in order to control the amount of water pumped from wells due to changes in pressure through the system. Pressure control systems are also employed in oil systems and hydraulic systems.

Many different devices have been developed to help store and control fluid flow and absorb pressure changes in a fluid pressure system. Such devices include storage devices, expansion tanks, pressure tanks, valves, and other devices used for storing liquids or gas, controlling the flow of liquids or gas, or controlling pressure within a fluid pressure system. However, most of these prior art systems suffer from serious flaws. Most require a tank that includes a number of parts, is difficult to install, and is expensive.

Accordingly, a need exists for an improved fluid pressure system that solves these and other deficiencies in the prior art. The present invention may be used in a multitude of fluid pressure systems where similar performance capabilities are required.

The present invention in one aspect comprises a free floating bladder installed within a fluid pressure system to store fluid within the system, control fluid expansion due to pressure and/or temperature changes, and control pressure in the system by damping excessive pressure changes.

Changes in the volume of the bladder inversely impact the amount of fluid expansion or the amount of fluid stored in the system. Specifically, a larger bladder volume results in less fluid storage or expansion and a smaller bladder volume results in more fluid storage or expansion. In a preferred aspect, the bladder is preferably free floating in the fluid pressure system with some mechanism to keep it somewhat in place as fluid passes or flows around it. The fluid preferably encompasses the free floating bladder of the fluid pressure system.

The diameter of the bladder is preferably restricted to a maximum diameter, which is preferably less than the diameter of the pressure tank of the fluid pressure system where it is installed. The free floating bladder is designed to absorb any expansion in the fluid pressure system as a result of pressure changes or temperature changes.

In one embodiment of the present invention, the fluid pressure system preferably includes a bladder with a valve attached to one end thereof. The valve is preferably sealed to the bladder, such that the connection does not allow any compressible gas into or out of the bladder. The bladder is preferably free floating within the system, except for a retainer that keeps it somewhat in place.

The retainer is preferably positioned within the fluid pressure system outside of at least one end of the bladder. The bladder may also preferably have an end cap attached to at least one end of the bladder. The valve preferably passes through the end cap and the retainer. The bladder also preferably includes at least one bumper to allow fluid to flow around the end of the bladder and through the retainer.

In another embodiment of the present invention, a retainer is preferably positioned outside both ends of the bladder.

In yet another embodiment of the present invention, a retainer is preferably positioned outside at least one end of the bladder and at least one end of the bladder includes an end cap attached thereto and with at least one other end of the bladder being a closed end of flexible bladder material. In addition, a valve may be inserted and sealed to at least one end of the bladder.

In still another embodiment of the present invention, a retainer is preferably positioned outside at least one end of the bladder, and the bladder includes a closed end of flexible bladder material at both ends of the bladder. In addition, a valve may be inserted and sealed to at least one end of the bladder.

In yet still another embodiment of the present invention, a retainer is preferably positioned outside at least one end of the bladder and the bladder is preferably made of a closed cell material. In another embodiment, the bladder includes closed cell material inserted within the interior of the bladder.

In another embodiment of the present invention, the bladder may include one or more chemicals inserted within the bladder that generate a chemical reaction causing gas to be generated, increasing the pressure within the bladder and expanding and compressing the bladder as a result of the chemical reaction.

The bladder of the present invention may be used in both low pressure and high pressure systems. An example of a high pressure system would be a hydraulic system, which can reach pressures in excess of 5000 psi. Other examples of pressure systems include gaseous systems, steam systems, oil systems and water systems. The bladder of the present invention may be used on all of these type systems.

The bladder of the present invention may also be manufactured without a valve in a compressed air/medium environment.

The present invention provides a bladder that is cost-effective, easily and securely fitted to a fluid pressure system, provides control of the amount and pressure of fluid flowing through and out of the fluid system, and solves the problems raised by existing prior art designs.

In other aspects of the present invention, a flexible confining tube restricts the expansion of a flexible bladder, with the confining tube in the most preferred form being cylindrical and extending concentrically around the bladder.

In further aspects of the present invention, both the pressure tank and the bladder located therein are flexible to allow the fluid pressure system to be folded or rolled in an assembled condition for shipping or storage before installation.

Various other features, objectives, and advantages of the present invention will be made apparent to those skilled in the art from the following detailed description.

BRIEF DESCRIPTION OF THE DRAWINGS

The illustrative embodiment may best be described by reference to the accompanying drawings where.

Figure 1:
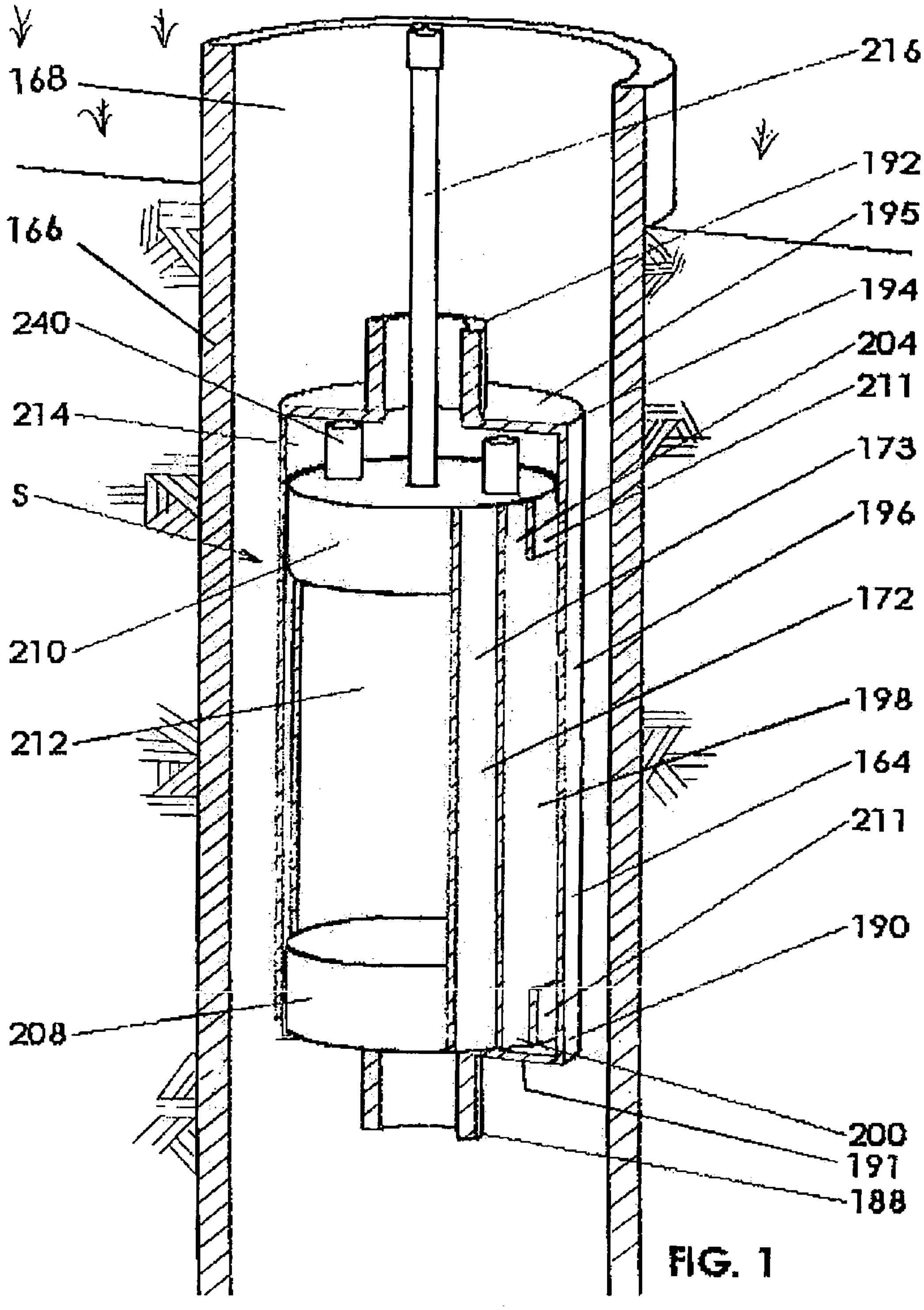
FIG. 1 is a partial, cross sectional view of a fluid pressure system in accordance with one embodiment of the present invention when the pressure in the fluid system is low.
Figure 2:
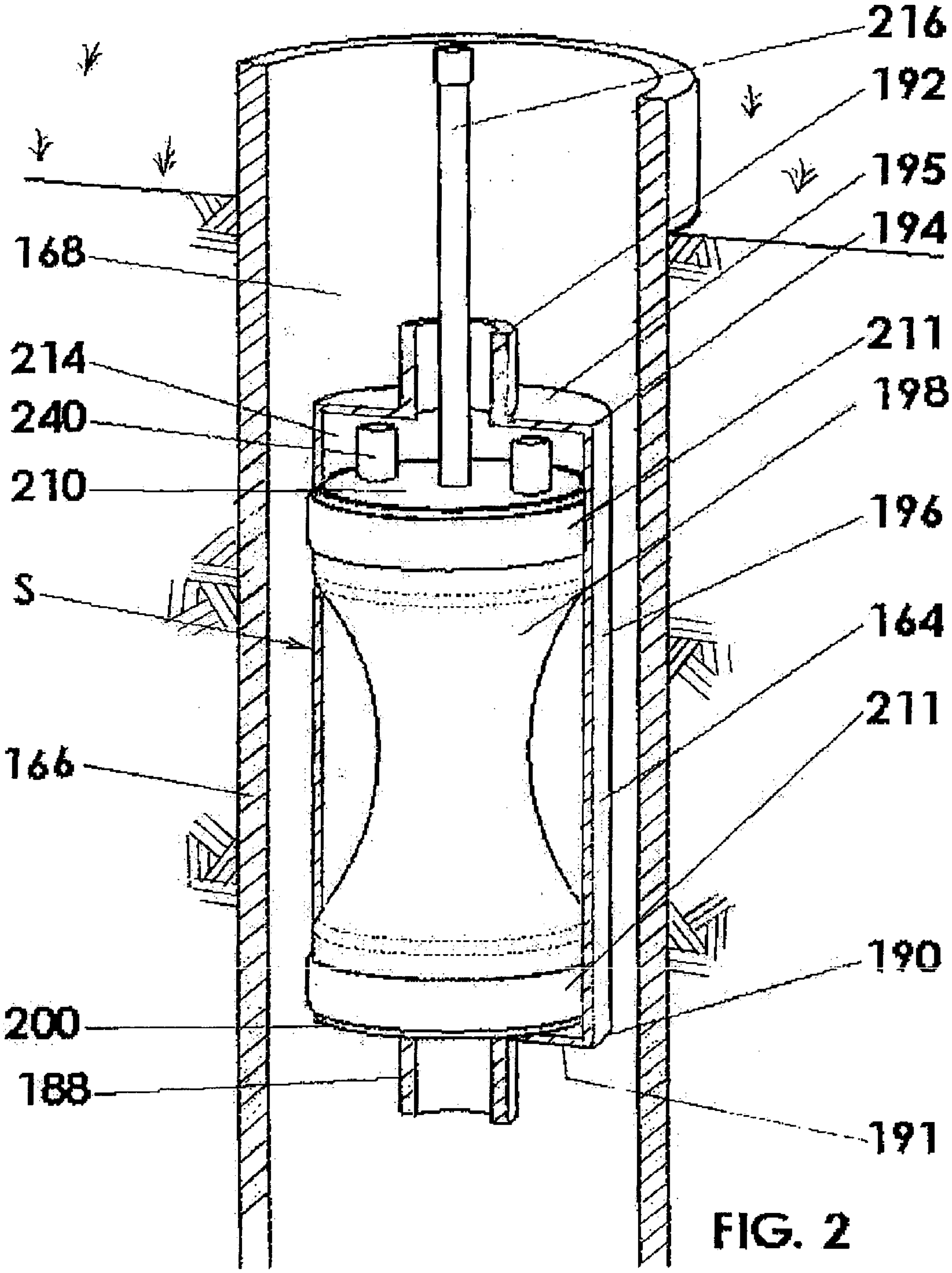
FIG. 2 is a partial, cross sectional view of the fluid pressure system of FIG. 1 in a compressed state when the pressure in the fluid system is high.
Figure 3:
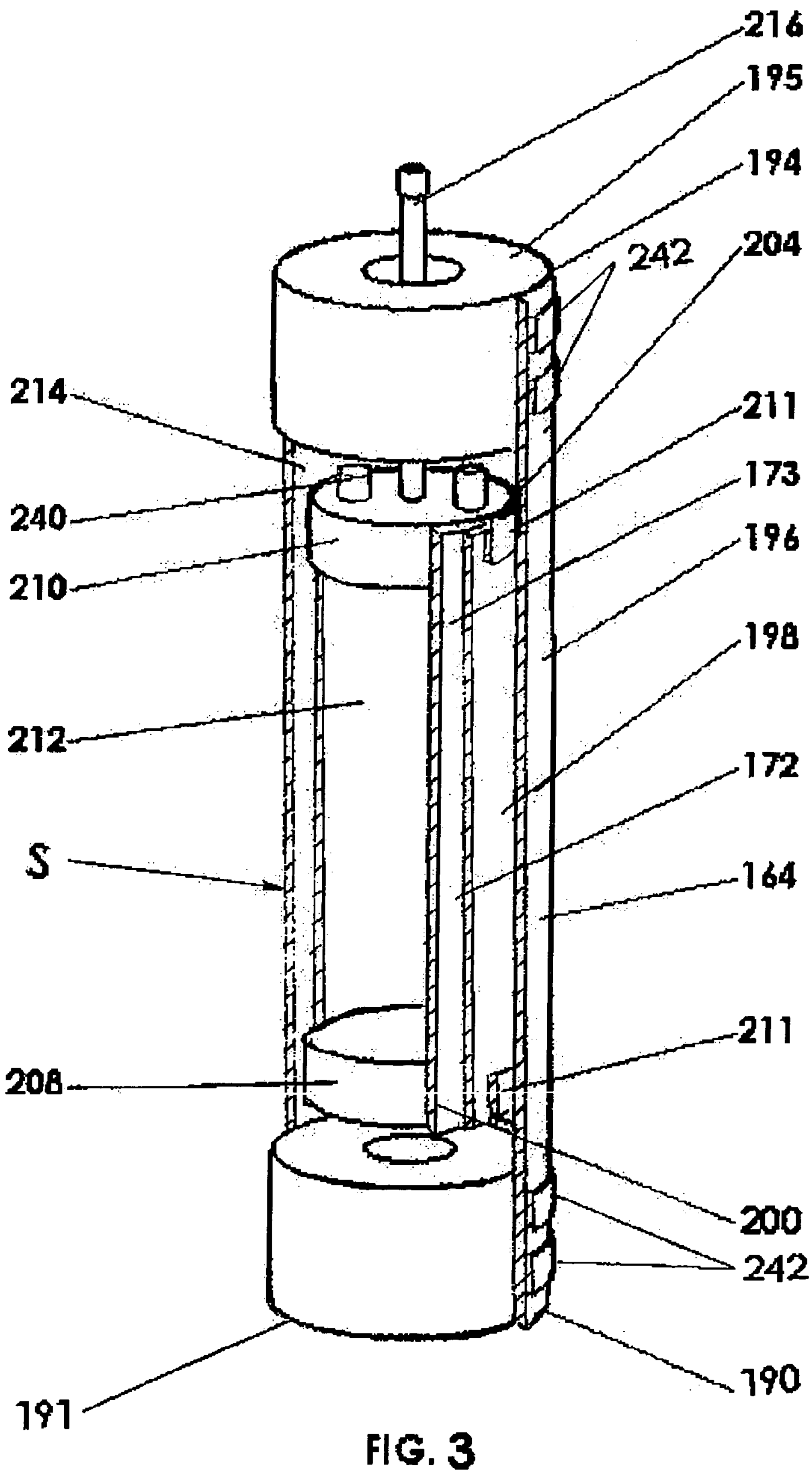
FIG. 3 is a partial, cross sectional view of a fluid pressure system in accordance with another embodiment of the present invention removed from the well and when the pressure in the fluid system is low.
Figure 4:
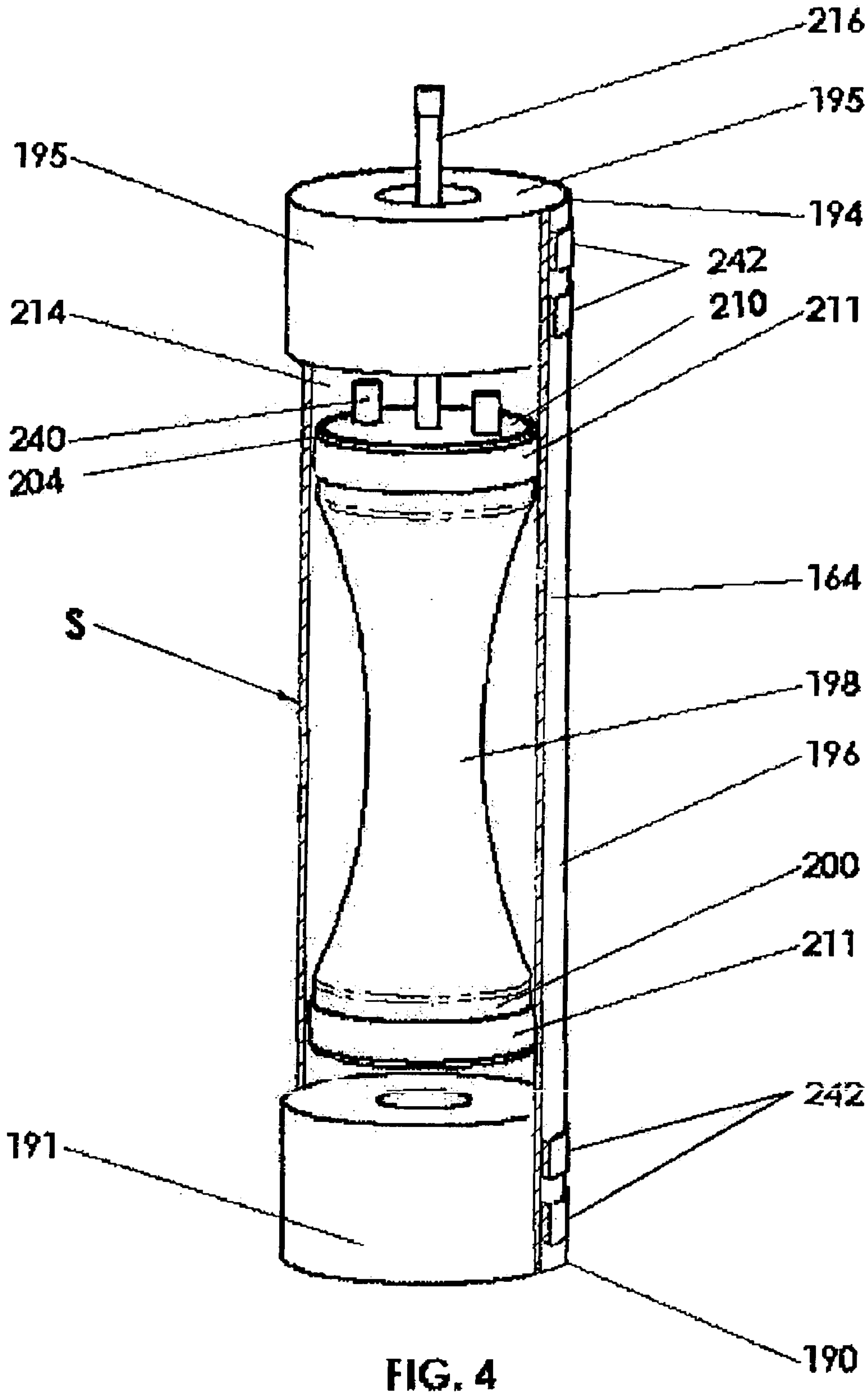
FIG. 4 is a partial, cross sectional view of the fluid pressure system of FIG. 3 in a compressed state removed from the well and when the pressure in the fluid system is high.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "upper", "lower", "side", "horizontal", "vertical", "downstream", "upstream", and similar terms are used herein, it should be understood that these terms have reference only to the structure shown in the drawings as it would appear to a person viewing the drawings and are utilized only to facilitate describing the illustrative embodiment.

DETAILED DESCRIPTION OF THE INVENTION

The present invention comprises a bladder installed within a fluid system to control the pressure of fluid in the fluid system. Changes in the volume of the bladder inversely impact the amount of fluid expansion or the amount of fluid stored in the system. Specifically, a larger bladder volume results in less fluid or gas storage or expansion and a smaller bladder volume results in more fluid or gas storage or expansion. The bladder is preferably free floating in the fluid system with some mechanism to keep it somewhat in place as fluid passes or flows around it. The fluid preferably encompasses the bladder of the fluid pressure system. The diameter of the bladder is preferably restricted to a maximum diameter, which is preferably less than the diameter of the fluid system where it is installed.

The fluid pressure system stores fluid, controls fluid expansion due to pressure or temperature changes, controls and adjusts pressure by smoothing out highs and lows of pressure changes. The fluid pressure system may be inserted in any location in a fluid system along the flow of fluid through the system. The bladder expands and contracts depending upon the pressure in the system. To be able to expand and contract, the bladder is preferably formed of a deformable and expandable material. The material should preferably be such that it limits the amount the bladder can expand. Alternatively, other manners may be used to limit the expansion of the bladder. The bladder can expand to a maximum diameter that is preferably less than the diameter of the fluid pressure system it is inserted into.

The bladder is preferably formed of an expandable material configured to define a closed volume. The bladder is preferably made of a material that doesn't allow fluid to enter the interior of the bladder or allow fluid to escape from the interior.

The present invention comprises a fluid pressure system installed within a fluid system. The fluid pressure system is inserted into the fluid system to store fluid in the system, control fluid expansion due to pressure or temperature changes, and control pressure in the system by damping excessive pressure changes.

In a preferred embodiment, the fluid pressure system preferably includes a bladder with a valve attached to one end thereof. The valve is preferably sealed to the bladder, such that the connection does not allow any gas and/or fluid into or out of the bladder.

The fluid pressure system stores fluid by compression and expansion of the bladder. The volume of the bladder changes inversely to the pressure of fluid in the fluid system. The bladder expands to a greater volume when the pressure of fluid in the fluid system decreases. The bladder can expand to a maximum diameter which is less than the diameter of the fluid system. An increase of fluid pressure applies a force to the bladder, thereby compressing the bladder.

The bladder is preferably free floating within the fluid pressure system, except for a retainer that keeps it in place. The retainer is preferably positioned within the fluid pressure system outside of at least one end of the bladder. The retainer functions to maintain the position of the bladder in one location in the fluid pressure system and prevents the bladder from moving uncontrollably through the fluid pressure system. The retainer accomplishes this by preventing movement of the bladder past it. The fluid in the fluid pressure system can pass through and around the bladder and retainer. The retainer may be of any form or shape. The retainer may be in the form of a ring. The bladder may also preferably have an end cap attached to at least one end of the bladder. The valve preferably passes through the end cap and the retainer.

The bladder also preferably includes at least one bumper to allow fluid flow around the end of the bladder and through the retainer.

In a preferred embodiment, a retainer is preferably positioned outside both ends of the bladder.

In a preferred embodiment, a retainer is preferably positioned outside at least one end of the bladder, and at least one end of the bladder includes an end cap attached thereto and with at least another end of the bladder being a closed end of flexible bladder material. In addition, a valve is inserted and sealed to at least one end of the bladder.

In a preferred embodiment, a retainer is preferably positioned outside at least one end of the bladder and the bladder includes a closed end of bladder material at both ends of the bladder. In addition, a valve is inserted and sealed to at least one end of the bladder.

In a preferred embodiment, a retainer is preferably positioned outside at least one end of the bladder, and the bladder is preferably made of a closed cell material. In another embodiment, closed cell material is preferably inside of the bladder. In these embodiments, preferably no valve would be required.

In a preferred embodiment, the bladder is installed within a tank, water heater or other fluid system body. Specifically the bladder could be connected to the tank, water heater or fluid system body which acts as the pressure tank by a flange or other fastening mechanism. Alternately, the bladder is free floating in the tank, water heater or fluid system body.

In another embodiment of the present invention, the bladder may include one or more chemicals inserted therein that generate a chemical reaction causing gas to be generated, increasing the pressure within the bladder for expanding the bladder.

In the embodiments including a valve, a pump may be connected to the valve to pump compressible gas such as air into the bladder. The amount of compressible gas inside the bladder is increased by pumping compressible gas into the bladder, thereby inflating the bladder. The amount of compressible gas inside the bladder is decreased by allowing compressible gas to exit or pumping compressible gas out of the bladder, thereby deflating the bladder. The pump may be positioned in the fluid system or may be positioned outside the fluid system. If positioned inside the fluid system, the pump must be able to function in the presence of the fluid traveling through the fluid system. The pump may be manually controlled or automatically controlled. The pump may be selectively operated to fill the bladder as required to provide a specific fluid or gaseous pressure. For example, an automatically controlled pump may operate so as to maintain a certain pressure or pressure range in the bladder and/or in the fluid pressure system. To provide such functionality, the pump may incorporate a timer, pressure gauge, computer, or other accessories. As discussed above, the bladder deflates when the fluid or gaseous pressure inside the fluid pressure system is relatively high. In this case, the pump deflates the bladder to increase the amount of available volume for fluid in the fluid pressure system. Such deflation acts to decrease the pressure of fluid in the fluid pressure system. The pump inflates the bladder to decrease the amount of available volume for fluid in the fluid pressure system. Such inflation acts to increase the pressure of fluid in the fluid pressure system.

The present invention may be used in a liquid or gaseous system, such as a water system, a steam system, an oil system, a hydraulic system, or any other form of fluid system that involves fluid storage, fluid expansion, and pressure and/or temperature fluctuations.

A fluid pressure system according to the preferred teachings of the present invention of the type shown and described in FIGS. 10–12 of U.S. patent application Ser. No. 10/082,899 filed on Feb. 25, 2002, which is hereby incorporated herein by reference, is shown in the drawings and generally designated S. For purposes of explanation of the basic teachings of the present invention, the same numerals designate the same or similar parts in the present Figures and FIGS. 10–12 of U.S. patent application Ser. No. 10/082,899. The description of the common numerals and fluid pressure system S may be found herein and in U.S. patent application Ser. No. 10/082,899. Fluid can be either a liquid or a gas, with the fluid pressure system S of the present invention having particularly advantageous application to water in a liquid state.

Fluid pressure system S generally includes a pressure tank 164 which is installed within the well casing 166 of a well 168 and in the most preferred form 10 to 20 feet below the pitless adapter. In particular, pressure tank 164 as shown includes an outer cylindrical, side wall 196 having an inlet end 190 and an outlet end 194. In the preferred form shown, the inlet end 190 includes an end cap 191 having an inlet opening from which a tank inlet drop pipe 188 extends. In like manner, the outlet end 194 includes an end cap 195 having an outlet opening from which a tank outlet drop pipe 192 extends and in fluid communication with a discharge pipe for distributing pressurized water from the pressure tank 164. In the form shown, the outer side wall 196 has generally constant size cross-sections between end caps 191 and 195 and which is of greater size than the cross-sectional sizes of drop pipes 188 and 192. In like manner, end caps 191 and 195 have generally equal cross-section sizes, and drop pipes 188 and 192 have generally equal cross-sectional sizes. In the forms shown, the inlet opening and outlet opening are arranged along a straight line.

The inlet drop pipe 188 of the pressure tank 164 may be connected to a control valve, a relief valve, and a submersible pump. The submersible pump installed in the well 168 pumps water from a water bearing aquifer through the relief valve and the flow control valve to the pressure tank 164 installed in the well casing 166 of the well 168. The output end of the submersible pump is connected to the relief valve. The relief valve releases excess pressure in the system and limits back pressure from building up in the submersible pump. The relief valve is connected to the flow control valve. The flow control valve controls output flow from the pump and relief valve. The flow control valve maintains constant water pressure in the system and automatically adjusts the submersible pump's output to match the flow requirements of the system. The tank inlet drop pipe 188 connects the flow control valve to the inlet end 190 of the pressure tank 164.

Fluid pressure system S further includes a flexible diaphragm bladder 172. Bladder 172 as shown includes a cylindrical side wall 173 having an inlet end 200 and an outlet end 204. In the preferred form shown, the inlet end 200 includes and is sealed by an inlet end plug 208. In like manner, the outlet end 204 includes and is sealed by an outlet end plug 210. Specifically, in the preferred form shown, ends 200 and 204 are sandwiched against the end plugs 208 and 210 by annular clamping straps 211. Preferably, straps 211 are formed from stainless steel. End plugs 208 and 210 can be made of plastic such as polyvinyl chloride or other non-corrosive material such as stainless steel which is generally rigid and generally maintains its shape under pressures encountered in the environment of the present invention. In the most preferred form, end plugs 208 and 210 can each include a raised annular flange which cooperate with straps 211 to ensure creating a seal against the escape of compressible gas or the entrance of fluid.

The side wall 173 and end plugs 208 and 210 define a volume which can compress or expand according to pressure subjected thereto. In the preferred form, a chamber 212 for holding a compressible gas such as and preferably air is formed inside the bladder 172, with the side wall 173 being formed of flexible material to allow the volume of the compressible gas inside of the bladder 172 to be variable to match the pressure inside and outside of the bladder 172. In the most preferred form, the side wall 173 is made out of flexible material and in the most preferred form having sufficient flexibility to allow folding or rolling and which is generally impermeable to the compressible gas and the fluid under pressure in the system S. In the most preferred form, side wall 173 is formed of butyl or other FDA or NSF approved material. A valve 216 extends through the outlet end plug 210 into the chamber 212 in the preferred form for introduction of the compressible gas therein to allow adjustment of pressure of the compressible gas in the chamber 212. In the preferred form, valve 216 extends into and is accessible in the tank outlet drop pipe 192.

A water chamber 214 is defined between the bladder 172 and the pressure tank 164. The pressure tank 164 has no center pipe, with water stored on the outside of the flexible diaphragm bladder 172 inside of the water chamber 214. A confining tube 198 separately formed from the bladder 172 is provided for supporting the flexible diaphragm bladder 172 in the pressure tank 164. Specifically, the confining tube 198 prevents the bladder 172 from over expanding to completely engage the pressure tank 164 along a peripheral portion and to allow passage of fluid around the bladder 172 while it is fully expanded inside of the pressure tank 164. In one preferred aspect of the present invention, confining tube 198 is formed of flexible material and in the most preferred form having sufficient flexibility to allow folding or rolling and which does not significantly expand under pressure contained in bladder 172. In the most preferred form, confining tube 198 is generally cylindrical in shape and is generally impermeable by fluid. Specifically, in the most preferred form, confining tube 198 is formed of nylon reinforced polyurethane. In the preferred form shown where the confining tube 198 is cylindrical and the bladder 172 is located in the confining tube 198, the bladder 172 has a slideable fit inside the confining tube 198. As an example, the outside diameter of confining tube 198 is 2.5 inches where the outside diameter of side wall 173 of the bladder 172 is 2.375 inches, with the lengths being 12 feet long in a preferred form. In this form, inner diameter of the side wall 196 of the pressure tank 164 could be 3.125 inches to accommodate the assembly of the bladder 172 and the confining tube 198 and the flow of fluid around the entire circumference thereof. The open ends of confining tube 198 are sandwiched against ends 200 and 204 of the bladder 172 (in turn sandwiched against the end plugs 208 and 210) by the annular clamping straps 211.

In further preferred aspects of the present invention, the assembly including the bladder 172 and the confining tube 198 are free floating in the pressure tank 164. In the most preferred form, the assembly including the bladder 172 and the confining tube 198 is free of physical connection with the pressure tank 164. In the preferred form with the cross-sectional size of the assembly including the bladder 172 and the confining tube 198 being greater than the cross-sectional size of the drop pipes 188 and 192, the end caps 191 and 195 act as upstream and downstream retainers for preventing movement of the assembly including the bladder 172 and the confining tube 198 therepast and out of the ends 190 and 194 due to fluid flow or gravity. However, in other embodiments, the pressure tank 164 could have cross-sectional sizes generally equal to that of drop pipes 188 and 192, with end caps 191 and 195 being minimized or eliminated. In that event, the upstream and downstream retainers could be formed by any desired mechanical constraints applicable to the particular design of the pressure tank 164 or to the particular fluid system application. Specifically, such constraints could be connections between the pressure tank 164 and the drop pipes 188 and 192 or by restrictors such as bolts threaded into or flanges, rings, other obstructions fixed such as by welding in the pressure tank 164 and/or the drop pipes 188 and 192 and which reduce the passageway to have a size smaller than the cross-sectional size of the assembly including the bladder 172 and the confining tube 198. Such an arrangement would allow the pressure tank 164 and the drop pipes 188 and 192 to be formed of the same stock material and assembled by the installer even at the site of well 168.

With free-floating being provided, suitable provisions must be provided to prevent the assembly including the bladder 172 and the confining tube 198 from blocking flow into drop pipe 192. In the preferred form shown, bumpers 240 are fixed to the end plug 210 and abut with end cap 195 or other downstream retainer to space at least portions of the end cap 195 from the outlet end plug 210 allowing fluid flow between the downstream, outlet end 204 of the bladder 172 and the end cap 195 into the tank outlet drop pipe 192. Bumpers 240 could be integrally formed with the end plug 210, could be bolts threaded into the end plug 210, or could be other forms. In this regard, end plug 210 and/or end cap 195 could be shaped such as having a rippled surface(s) or other surface(s) which do not mate. Furthermore, bumpers 240 could be reversed and be fixed to the end cap 195 rather than end plug 210, if desired.

Flow of fluid through drop pipe 188 into pressure tank 164 typically will force the assembly including the bladder 172 and the confining tube 198 from blocking flow into pressure tank 164. However, if desired or needed based upon the particular application, bumpers can be provided between end cap 191 and end plug 208 in a similar manner as bumpers 240 according to the teachings of the present invention.

The side wall 196 and end caps 191 and 195 are formed of material which is impermeable to the fluid. In the preferred form shown in FIG. 1, pressure tank 164 maintains its shape under fluid pressure encountered in the environment of the present invention. Particularly, side walls 196 and end caps 191 and 195 are formed of plastic such as polyvinyl chloride or other non-corrosive material such as stainless steel interconnected together such as by welding. In other aspects of the present invention, side wall 196 is formed of flexible material and in the most preferred form having sufficient flexibility to allow folding or rolling and which does not significantly expand under pressures contained in pressure tank 164. In the most preferred form, side wall 196 is formed of the same material as confining tube 198 but which is of a larger size. In the preferred form, end caps 191 and 195 are formed of material which is generally rigid and generally maintains its shape under pressures encountered in the environment of the present invention. In the preferred form, end caps 191 and 195 are formed of the same material as end plugs 208 and 210 but of larger cross-sectional sizes. In the preferred form, the ends 190 and 194 are sandwiched against the end caps 191 and 195 by annular clamping straps 242. Preferably, straps 242 are formed from stainless steel. In the most preferred form, end caps 191 and 195 can each include a raised annular flange which cooperate with the straps 242 to ensure creating a seal against the escape of fluid. In this regard, a gasket such as formed of butyl rubber could be inserted between each end end cap 191 and 195 and the side wall 196 to ensure sealing therebetween.

Figure 5:
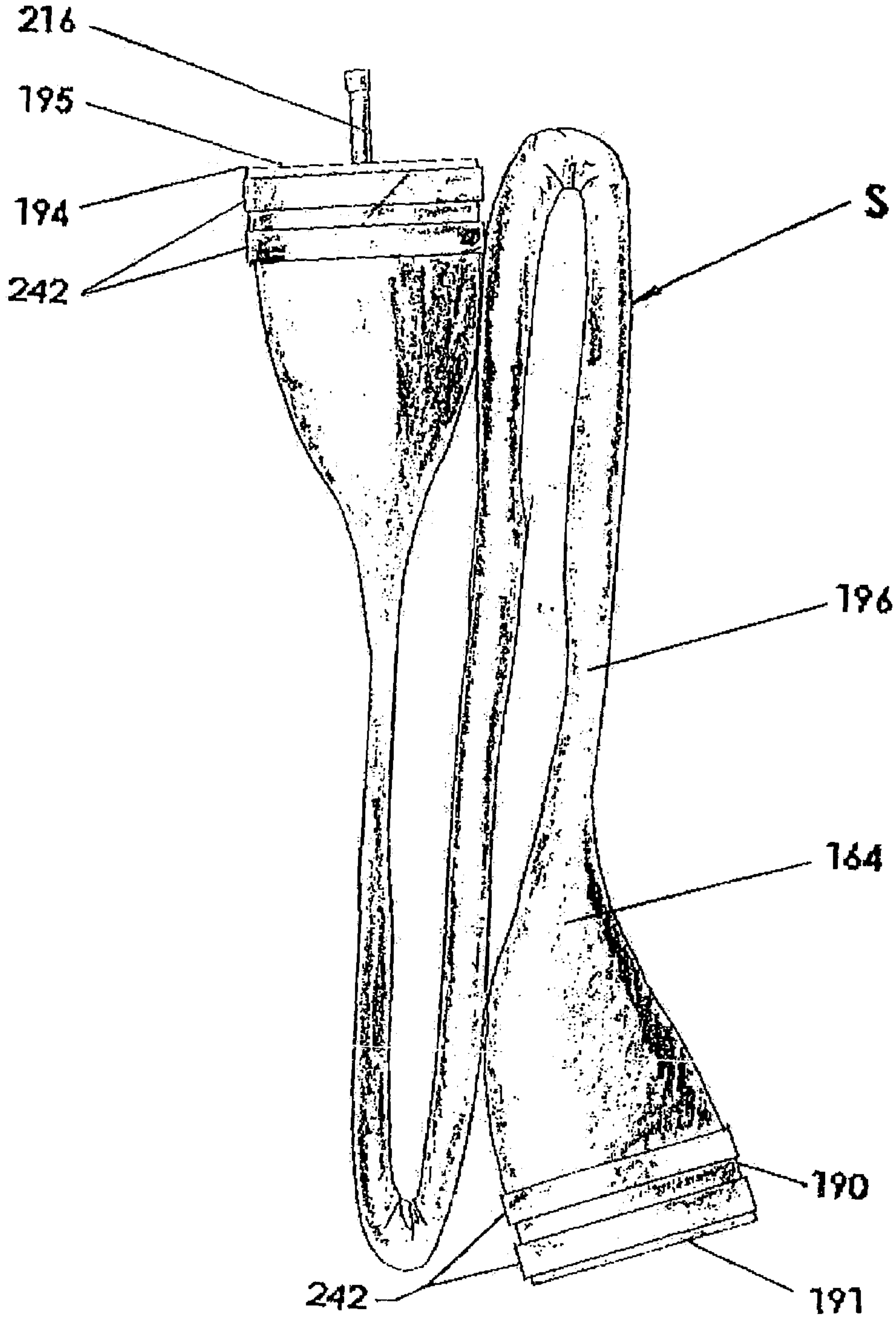
FIG. 5 is an elevational view of the fluid pressure system of FIG. 3 in a folded state.

It should be appreciated that with side walls 173 and 196 and confining tube 198 formed of flexible material, fluid pressure system S according to the teachings of the present invention can be packaged by the manufacturer for packaging in an assembled rolled or folded condition such as shown in FIG. 5. Such a rolled or folded condition minimizes the space required for storage and shipping. To install, the installer unrolls or unfolds system S, attaches drop pipes 188 and 192 to end caps 191 and 195, the system S is installed in the well 168 with the drop pipes 188 and 192, the submersible pump and other well components, and the bladder 172 is inflated with the compressible gas to the desired pressure, which inflation could happen anytime after system S is unrolled or unfolded as desired by the installer for the particular application.

Now that the basic teachings of the present invention have been explained, many extensions and variations will be obvious to one having ordinary skill in the art. For example, although the fluid pressure system S has been shown and explained including general features in combination which is believed to produce synergistic results, such features can be used singly or in other combinations according to the teachings of the present invention. As an example, an assembled, foldable pressure system S could be designed according to the teachings of the present invention which does not utilize a free-floating bladder 172 and/or confining tube 198.

Although shown as formed of solid material having annular cross-sections, confining tube 198 could take other forms according to the teachings of the present invention. As an example, confining tube 198 could be formed of netting or screen type material and/or could extend only partially around bladder 172 according to the teachings of the present invention.

Although shown and described for use in a well 168, fluid pressure system S according to the teachings of the present invention could be utilized in other fluid environments including but not limited to hot water and supply tanks, systems for fluids other than water, and the like. Likewise, although pressure tank 164 and bladder 172 have been shown and described as including rigid end caps 191 and 195 and end plugs 208 and 210 at both ends 190, 194, 200 and 204, one or both ends 190, 194, 200 and 204 could be closed by being closed by other manners such as integral ends, football shaped ends, or the like according to the teachings of the present invention. In the same regard, pressure tank 164, bladder 172, and confining tube 198 can have other forms, shapes, and constructions than as shown and described according to the teachings of the present invention.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention.

What is claimed is:

1. Fluid pressure system comprising, in combination: a pressure tank through which fluid passes; and an expandable bladder located in the pressure tank, with the bladder defining a volume which can compress or expand according to pressure of fluid intermediate the bladder and the pressure tank, with the bladder being free floating in the fluid in the pressure tank, wherein the pressure tank includes an inlet opening and an outlet opening, with fluid flowing into the inlet opening and out of the outlet opening through the pressure tank, wherein the volume of the bladder contains a compressible gas, with a valve in communication with the volume for adding the compressible gas to the volume, with the valve being accessible for adjustment of the compressible gas through one of the inlet and outlet openings of the pressure tank.

2. The fluid pressure system of claim 1 wherein the bladder is free of physical connection with the pressure tank.

3. The fluid pressure system of claim 2 with the pressure tank including a downstream retainer for preventing movement of the bladder past the downstream retainer and through the outlet opening.

4. Fluid pressure system comprising, in combination: a pressure tank through which fluid passes; and an expandable bladder located in the pressure tank, with the bladder defining a volume which can compress or expand according to pressure of fluid intermediate the bladder and the pressure tank, with the bladder being free floating in the fluid in the pressure tank, wherein the bladder is free of physical connection with the pressure tank, wherein the pressure tank includes an inlet opening and an outlet opening, with fluid flowing into the inlet opening and out of the outlet opening through the pressure tank, with the pressure tank including a downstream retainer for preventing movement of the bladder past the downstream retainer and through the outlet opening, wherein the bladder includes a downstream end adjacent to the outlet opening and an upstream end, with the fluid pressure system including a bumper for abutting between the downstream retainer and the downstream end, with the bumper spacing at least portions of the downstream end from the downstream retainer allowing fluid flow between the downstream end and the downstream retainer.

5. The fluid pressure system of claim 4 wherein the downstream end of the bladder includes a rigid downstream end cap having a periphery, with the bladder secured to and sealed to the rigid downstream end cap, with the bumper mounted to the rigid downstream end cap.

6. The fluid pressure system of claim 5 wherein the volume of the bladder contains a compressible gas, with a valve passing through the downstream end cap and in communication with the volume for adding the compressible gas to the volume.

7. The fluid pressure system of claim 6 wherein the upstream end of the bladder includes a rigid upstream end cap, with the bladder secured to and sealed to the rigid upstream end cap, with the pressure tank including an upstream retainer for preventing movement of the bladder past the upstream retainer and through the inlet opening.

8. The fluid pressure system of claim 7 wherein the rigid upstream and downstream end caps are of equal cross sectional sizes, with the bladder formed of flexible material which is impermeable to the compressible gas and the fluid and which is expandable under pressure of the compressible gas, with the fluid pressure system further comprising, in combination: a confining tube formed of flexible material which generally does not expand under pressure of the compressible gas, with the confining tube restricting the expansion of the bladder.

9. The fluid pressure system of claim 8 wherein the confining tube is of a constant annular size generally equal to the cross sectional sizes of the upstream and downstream end caps and generally maintaining the constant annular size, with the bladder located in the confining tube.

10. The fluid pressure system of claim 9 wherein the bladder is formed of butyl rubber and the confining tube is formed of nylon reinforced polyurethane.

11. The fluid pressure system of claim 9 wherein the pressure tank is formed of flexible material which is impermeable to the fluid, with the pressure tank maintaining a constant size under pressure by the fluid.

12. The fluid pressure system of claim 11 with the pressure tank including first and second rigid end caps of equal cross sectional sizes and a cylindrical sidewall, with the cylindrical sidewall secured and sealed to and between the first and second rigid end caps, with the first rigid end cap including the inlet opening and the second rigid end cap including the outlet opening.

13. The fluid pressure system of claim 12 with the flexible material forming the pressure tank is the same as the flexible material forming the confining tube.

14. Fluid pressure system comprising, in combination: a pressure tank through which fluid passes; and an expandable bladder located in the pressure tank, with the bladder defining a volume which can compress or expand according to pressure of fluid intermediate the bladder and the pressure tank, with the bladder being free floating in the fluid in the pressure tank, wherein the pressure tank is formed of flexible material which is impermeable to the fluid, with the pressure tank maintaining a constant size under pressure by the fluid, with the bladder formed of flexible material.

15. The fluid pressure system of claim 14 further comprising, in combination: a confining tube formed of flexible material, with the confining tube restricting the expansion of the bladder.

16. Fluid pressure system comprising, in combination: a pressure tank through which fluid passes; an expandable bladder located in the pressure tank, with the bladder defining a volume which can compress or expand according to pressure of fluid intermediate the bladder and the pressure tank, with the bladder formed of flexible material; and a confining tube formed of flexible material, with the confining tube restricting the expansion of the bladder.

17. The fluid pressure system of claim 16 wherein the bladder includes rigid upstream and downstream end caps of equal cross-sectional sizes and a cylindrical, flexible side wall, with the end caps sealed to the cylindrical flexible side wall.

18. The fluid pressure system of claim 17 wherein the confining tube is of a constant annular size generally equal to the cross sectional sizes of the upstream and downstream end caps and generally maintaining the constant annular size, with the bladder located in the confining tube.

19. Fluid pressure system comprising, in combination: a pressure tank through which fluid passes; and an expandable bladder located in the pressure tank, with the bladder defining a volume which can compress or expand according to pressure of fluid intermediate the bladder and the pressure tank, with the bladder formed of flexible material, wherein the pressure tank is formed of flexible material which is impermeable to the fluid, with the pressure tank maintaining a constant size under pressure by the fluid.

20. The fluid pressure system of claim 19 further comprising, in combination: a confining tube formed of flexible material, with the confining tube restricting the expansion of the bladder.

21. The fluid pressure system of claim 19 wherein the pressure tank includes an inlet opening and an outlet opening, with fluid flowing into the inlet opening and out of the outlet opening through the pressure tank, with the pressure tank including first and second rigid end caps of equal cross sectional sizes and a cylindrical sidewall, with the sidewall secured and sealed to and between the first and second rigid end caps, with the first rigid end cap including the inlet opening and the second rigid end cap including the outlet opening.

22. The fluid pressure system of claim 1 wherein the bladder includes a first rigid end cap, with the valve passing through the first rigid end cap, with the first rigid end cap being separately formed from the pressure tank.

23. The fluid pressure system of claim 22 wherein the bladder includes a second rigid end cap, with the bladder secured to and sealed to the first and second rigid end caps.

* * * * *